(12) United States Patent
Xu et al.

(10) Patent No.: US 8,896,553 B1
(45) Date of Patent: Nov. 25, 2014

(54) HYBRID SENSOR MODULE

(75) Inventors: Yansun Xu, Mountain View, CA (US); Jinghui Mu, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 205 days.

(21) Appl. No.: 13/307,350

(22) Filed: Nov. 30, 2011

(51) Int. Cl.
*G06F 3/041* (2006.01)
(52) U.S. Cl.
USPC ............ 345/173; 345/174; 345/175
(58) Field of Classification Search
CPC ......... G06F 2203/04106; G06F 3/042; G06F 3/0421; G06F 3/044; G06F 3/045
USPC .......................................... 345/173, 174, 175
See application file for complete search history.

(56) References Cited

U.S. PATENT DOCUMENTS

| | | | |
|---|---|---|---|
| 3,922,093 A | 11/1975 | Dandliker et al. | |
| 4,546,347 A | 10/1985 | Kirsch | |
| 4,799,055 A | 1/1989 | Nestler et al. | |
| 5,015,096 A | 5/1991 | Kowalski et al. | |
| 5,288,993 A | 2/1994 | Bidiville et al. | |
| 5,473,344 A | 12/1995 | Bacon et al. | |
| 5,578,813 A | 11/1996 | Allen et al. | |
| 5,644,139 A | 7/1997 | Allen et al. | |
| D382,550 S | 8/1997 | Kaneko et al. | |
| D385,542 S | 10/1997 | Kaneko et al. | |
| 5,703,356 A | 12/1997 | Bidiville et al. | |
| 5,729,008 A | 3/1998 | Blalock et al. | |
| 5,729,009 A | 3/1998 | Daendliker et al. | |
| 5,786,804 A | 7/1998 | Gordon | |
| 5,825,044 A | 10/1998 | Allen et al. | |
| 5,854,482 A | 12/1998 | Bidiville et al. | |
| 5,907,152 A | 5/1999 | Daendliker et al. | |
| 5,933,102 A | 8/1999 | Miller et al. | |
| 5,963,197 A | 10/1999 | Bacon et al. | |
| 5,994,710 A | 11/1999 | Knee et al. | |
| 6,031,218 A | 2/2000 | Piot et al. | |
| 6,037,643 A | 3/2000 | Knee | |
| 6,057,540 A | 5/2000 | Gordon et al. | |

(Continued)

FOREIGN PATENT DOCUMENTS

| | | |
|---|---|---|
| CN | 101593785 A | 12/2009 |
| JP | 2009031666 A | 2/2009 |

(Continued)

OTHER PUBLICATIONS

ADNB-6011-EV and ADNB-6012-EV High Performance Laser Mouse Bundles Data Sheet, Aug. 17, 2007, Avago Technologies, 52 pages.

(Continued)

*Primary Examiner* — Latanya Bibbins

(57) ABSTRACT

A hybrid sensor module and methods of operating the same are provided. In one embodiment, the hybrid sensor module includes: (i) a touch sensor configured to sense motion of an object in proximity to a surface of the touch sensor; (ii) an optical navigation sensor (ONS) configured to illuminate the object through the surface of the touch sensor and to sense motion of the object based on light returned from the object; and (iii) a controller electrically coupled to the touch sensor and the ONS to process the sensed motion of the object and to generate an output signal in response to the sensed motion, wherein the controller is configured to dynamically adjust a tracking resolution of the hybrid sensor module based on a characteristic of the sensed motion. Other embodiments are disclosed.

18 Claims, 7 Drawing Sheets

(56) References Cited

U.S. PATENT DOCUMENTS

| | | |
|---|---|---|
| 6,097,371 A | 8/2000 | Siddiqui et al. |
| 6,151,015 A | 11/2000 | Badyal et al. |
| 6,172,354 B1 | 1/2001 | Adan et al. |
| 6,215,417 B1 | 4/2001 | Krass et al. |
| 6,225,617 B1 | 5/2001 | Daendliker et al. |
| 6,233,368 B1 | 5/2001 | Badyal et al. |
| 6,281,881 B1 | 8/2001 | Siddiqui et al. |
| 6,281,882 B1 | 8/2001 | Gordon et al. |
| 6,300,936 B1 | 10/2001 | Braun et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| D464,352 S | 10/2002 | Kerestegian |
| 6,462,330 B1 | 10/2002 | Venkat et al. |
| 6,476,970 B1 | 11/2002 | Smith |
| 6,504,530 B1 | 1/2003 | Wilson et al. |
| 6,529,184 B1 | 3/2003 | Julienne |
| 6,585,158 B2 | 7/2003 | Norskog |
| 6,603,111 B2 | 8/2003 | Dietz et al. |
| 6,621,483 B2 | 9/2003 | Wallace et al. |
| 6,642,506 B1 | 11/2003 | Nahum et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 6,859,196 B2 | 2/2005 | Kehlstadt |
| 7,030,860 B1 | 4/2006 | Hsu et al. |
| 7,042,575 B2 | 5/2006 | Carlisle et al. |
| 7,116,117 B2 | 10/2006 | Nakano et al. |
| 7,161,582 B2 | 1/2007 | Bathiche et al. |
| 7,199,350 B2 | 4/2007 | Chien |
| 7,221,356 B2 | 5/2007 | Oliver et al. |
| 7,274,808 B2 | 9/2007 | Baharav et al. |
| 7,295,186 B2 | 11/2007 | Brosnan |
| 7,313,255 B2 | 12/2007 | Machida et al. |
| 7,324,086 B2 | 1/2008 | Kong |
| 7,420,542 B2 | 9/2008 | Butterworth et al. |
| 7,525,082 B2 | 4/2009 | Itagaki |
| 7,557,338 B2 | 7/2009 | Gruhlke et al. |
| 7,868,281 B2 | 1/2011 | Leong et al. |
| 8,031,176 B1 | 10/2011 | Sanders et al. |
| 8,081,162 B2 | 12/2011 | Teoh et al. |
| 8,111,344 B2 | 2/2012 | Moon et al. |
| 8,400,409 B1 * | 3/2013 | Francis ........................ 345/173 |
| 8,416,191 B2 | 4/2013 | Gao et al. |
| 2002/0130835 A1 | 9/2002 | Brosnan |
| 2002/0158300 A1 | 10/2002 | Gee |
| 2002/0190953 A1 | 12/2002 | Gordon et al. |
| 2003/0034959 A1 | 2/2003 | Davis et al. |
| 2004/0084610 A1 | 5/2004 | Leong et al. |
| 2004/0189593 A1 | 9/2004 | Koay |
| 2004/0208348 A1 | 10/2004 | Baharav et al. |
| 2005/0024336 A1 | 2/2005 | Xie et al. |
| 2005/0024623 A1 | 2/2005 | Xie et al. |
| 2005/0083303 A1 | 4/2005 | Schroeder et al. |
| 2005/0248534 A1 | 11/2005 | Kehlstadt |
| 2006/0048071 A1 | 3/2006 | Jarrett et al. |
| 2006/0091298 A1 | 5/2006 | Xie et al. |
| 2006/0279548 A1 | 12/2006 | Geaghan |
| 2007/0008286 A1 | 1/2007 | Theytaz et al. |
| 2007/0052684 A1 | 3/2007 | Gruhlke et al. |
| 2007/0057157 A1 | 3/2007 | Trisnadi et al. |
| 2007/0075710 A1 | 4/2007 | Hargreaves et al. |
| 2007/0139381 A1 | 6/2007 | Spurlock et al. |
| 2007/0146318 A1 | 6/2007 | Juh et al. |
| 2007/0215793 A1 | 9/2007 | Gruhlke et al. |
| 2007/0291001 A1 | 12/2007 | Trisnadi et al. |
| 2008/0006762 A1 | 1/2008 | Fadell et al. |
| 2008/0007526 A1 | 1/2008 | Xu et al. |
| 2008/0048972 A1 | 2/2008 | Kakarala |
| 2008/0061219 A1 | 3/2008 | Lee et al. |
| 2008/0094356 A1 | 4/2008 | Ording et al. |
| 2008/0158158 A1 | 7/2008 | Cheah et al. |
| 2008/0167834 A1 | 7/2008 | Herz et al. |
| 2008/0174570 A1 | 7/2008 | Jobs et al. |
| 2009/0041476 A1 | 2/2009 | Ann et al. |
| 2009/0166411 A1 | 7/2009 | Kramer et al. |
| 2009/0244026 A1 | 10/2009 | Purdy et al. |
| 2010/0013771 A1 | 1/2010 | Cheng |
| 2010/0073328 A1 | 3/2010 | Lynch et al. |
| 2010/0302208 A1 * | 12/2010 | Brosnan et al. ............... 345/175 |
| 2010/0315337 A1 | 12/2010 | Ferren et al. |
| 2010/0315413 A1 | 12/2010 | Izadi et al. |
| 2011/0018840 A1 * | 1/2011 | Fann et al. ................... 345/174 |
| 2011/0141014 A1 | 6/2011 | Liao et al. |
| 2011/0234539 A1 | 9/2011 | Liao et al. |
| 2011/0248961 A1 | 10/2011 | Svajda et al. |
| 2011/0310018 A1 | 12/2011 | Song et al. |
| 2011/0316790 A1 | 12/2011 | Ollila et al. |
| 2012/0002693 A1 | 1/2012 | Hasegawa et al. |
| 2012/0127076 A1 | 5/2012 | Song et al. |
| 2012/0176339 A1 * | 7/2012 | Chen et al. ................... 345/175 |
| 2012/0320385 A1 | 12/2012 | Mu et al. |

FOREIGN PATENT DOCUMENTS

| | | |
|---|---|---|
| KR | 20070008743 A | 1/2007 |
| KR | 20110051165 A | 5/2011 |
| WO | 2010081652 A | 7/2010 |

OTHER PUBLICATIONS

ADNB-6532 Small Form Factor Laser Stream Mouse Bundle Data Sheet, Nov. 10, 2006, Avago Technologies, 44 pages.

ADNK-6013 Optical Mouse Designer's Kit Design Guide, Mar. 30, 2006, Avago Technologies, 24 pages.

Angelopoulou, Elli; "The Reflectance Spectrum of Human Skin," 1999; Department of Computer & Information Science, University of Pennsylvania; pp. 1-14.

U.S. Appl. No. 12/009,863: "Optical Navigation System Using a Single-Package Motion Sensor" Steven Sanders et al., filed on Jan. 22, 2008: 27 pages.

U.S. Appl. No. 12/218,021: "User Interface Devices, Methods, and Computer Readable Media for Sensing Movement of an Actuator Across a Surface of a Window," Mark Francis, filed on Jul. 10, 2008; 26 pages.

U.S. Appl. No. 13/231,176: Optical Navigation Module With Programmable Lift-Cut-off Ke-Cai Zeng et al., filed on Sep. 13, 2011; 33 pages.

U.S. Appl. No. 13/248,355 "Optical Navigation Module With Capacitive Sensor," Jinghui Mu et al., Filed on Sep. 29, 2011; 33 pages.

U.S. Appl. No. 13/252,768: "Optical Navigation System Using a Single-Package Motion Sensor" Steven Sanders et al., filed on Oct. 4, 2011; 28 pages.

Application No. PCT/US11/53552 "An Optical Navigation Module With Capacitive Sensor," Filed on Sep. 27, 2011; 31 pages.

International Search Report for International Application No. PCT/US2011/053552 dated May 23, 2012; 3 pages.

KIPO ISR/WO for Application No. PCT/US2011/053552 dated May 23, 2012; 10 pages.

USPTO Advisory Action for U.S. Appl. No. 12/218,021 dated Nov. 7, 2011; 3 pages.

USPTO Advisory Action for U.S. Appl. No. 12/218,021 dated May 9, 2012; 3 pages.

USPTO Advisory Action for U.S. Appl. No. 13/231,176 dated Dec. 6, 2013; 3 pages.

(56) References Cited

OTHER PUBLICATIONS

USPTO Final Office Action for U.S. Appl. No. 13/231,176 dated Oct. 8, 2013; 18 pages.
USPTO Final Rejection for U.S. Appl. No. 12/218,021 dated Feb. 22, 2012; 45 pages.
USPTO Final Rejection for U.S. Appl. No. 12/218,021 dated Aug. 29, 2011; 41 pages.
USPTO Final Rejection for U.S. Appl. No. 13/252,768 dated Dec. 7, 2012; 7 pages.
USPTO Non Final rejection for U.S. Appl. No. 13/231,176 dated Mar. 26, 2014; 15 pages.
USPTO Non Final Rejection for U.S. Appl. No. 13/248,355 dated May 7, 2014; 27 pages.
USPTO Non Final Rejection for U.S. Appl. No. 13/252,768 dated Jun. 25, 2012; 12 pages.
USPTO Non-Final Rejection for U.S. Appl. No. 12/009,863 dated Dec. 8, 2010; 13 pages.
USPTO Non-Final Rejection for U.S. Appl. No. 12/218,021 dated Apr. 27, 2011; 34 pages.
USPTO Non-Final Rejection for U.S. Appl. No. 13/231,176 dated Jun. 21, 2013; 22 pages.
USPTO Notice of Allowance for U.S. Appl. No. 12/009,863 dated May 26, 2011; 5 pages.
USPTO Notice of Allowance for U.S. Appl. No. 12/218,021 dated Jan. 30, 2013; 9 pages.
USPTO Notice of Allowance for U.S. Appl. No. 12/218,021 dated Oct. 5, 2012; 9 pages.
USPTO Notice of Allowance for U.S. Appl. No. 13/252,768 dated Jan. 31, 2013; 8 pages.
USPTO Notice of Allowance for U.S. Appl. No. 13/252,768 dated May 22, 2013; 8 pages.
USPTO Notice of Allowance for U.S. Appl. No. 13/252,768 dated Sep. 6, 2013; 6 pages.
USPTO Notice of Allowance for U.S. Appl. No. 13/252,768 dated Dec. 10, 2013; 7 pages.
USPTO Requirement for Restriction for U.S. Appl. No. 13/231,176 dated May 21, 2013; 5 pages.
Written Opinion of the International Searching Authority for International Application No. PCT/US2011/053552 dated May 23, 2012; 5 pages.

* cited by examiner

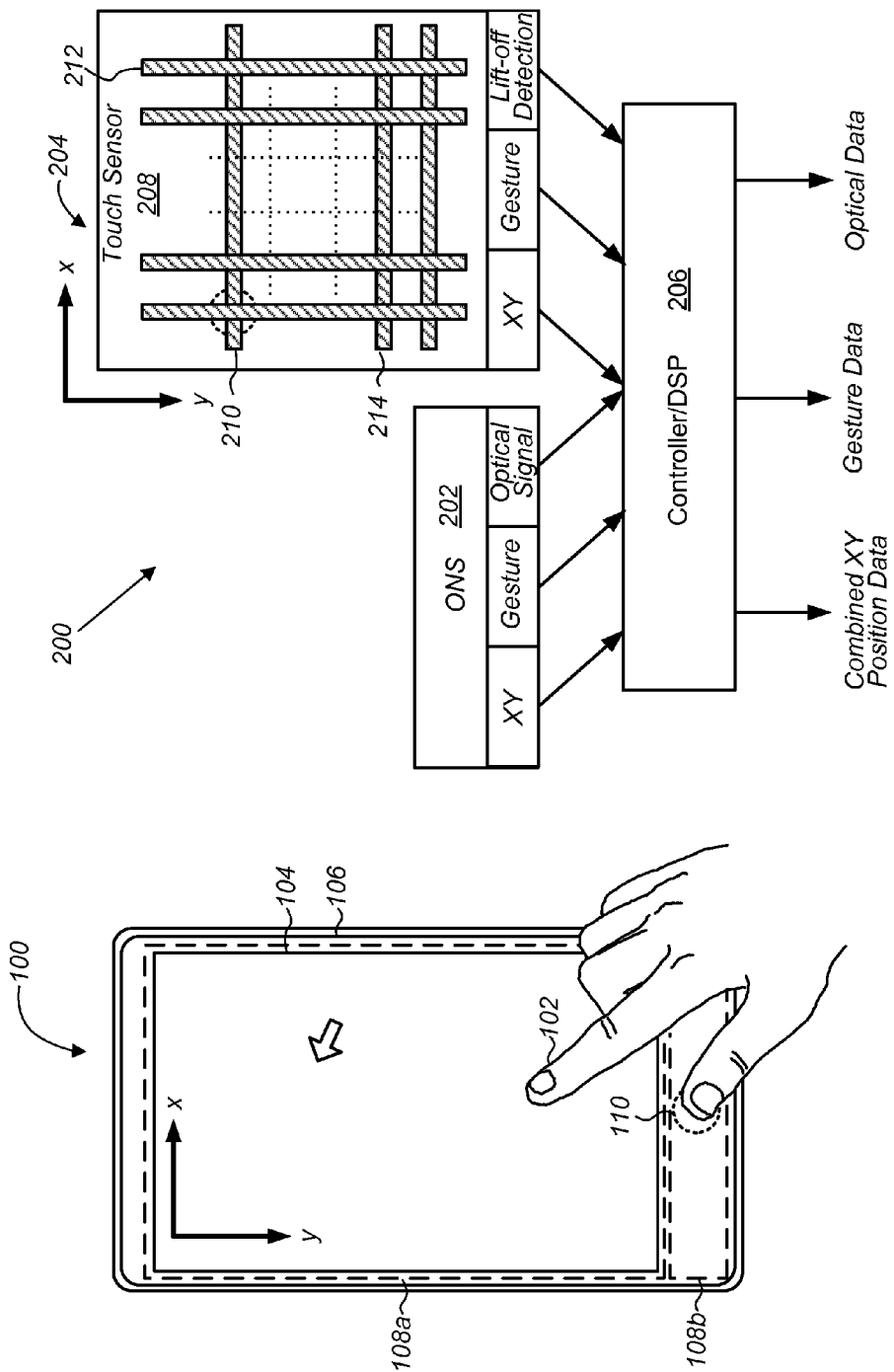

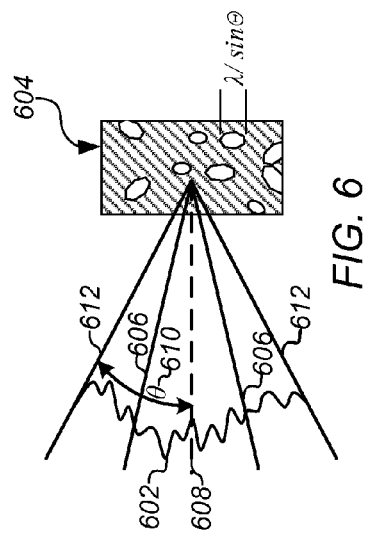
FIG. 6
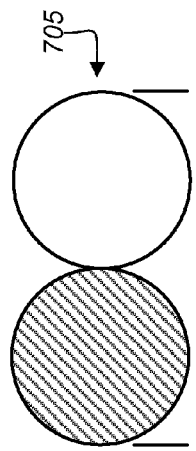
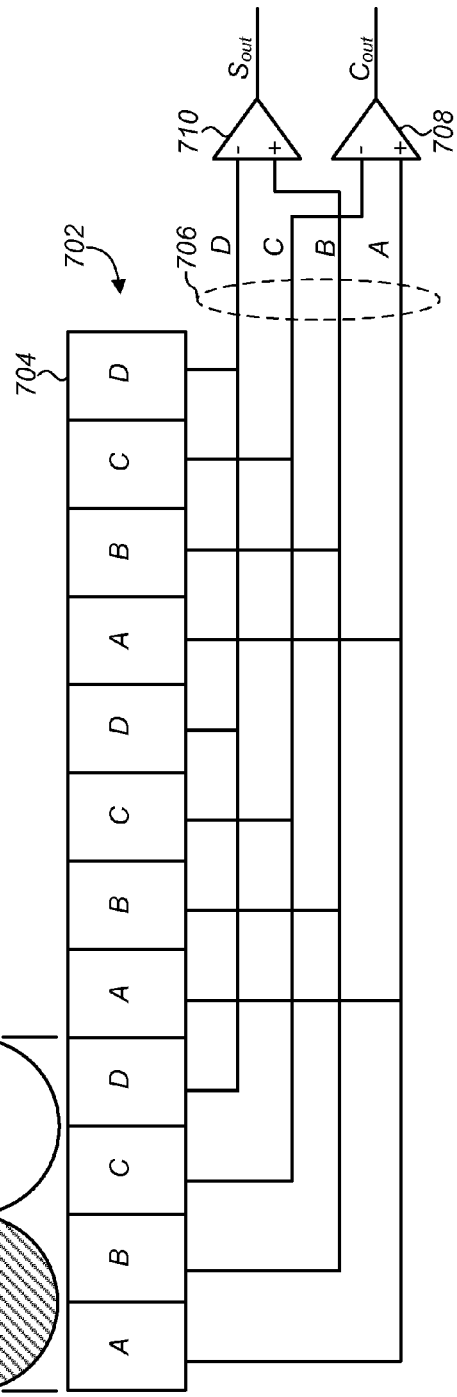
FIG. 7

HYBRID SENSOR MODULE

TECHNICAL FIELD

The present disclosure relates generally to a sensor module, and more particularly to a hybrid sensor module including an optical navigation sensor and a touch sensor and a method of operating the same.

BACKGROUND

Data processing systems, such as personal computers, tablet computers, entertainment systems, game consoles, and cellular telephones, commonly include a human interface device (HID) for data input and/or controlling cursor movement. One widely utilized HID is a touch pad or touchscreen utilizing a touch sensor, such as a capacitive or resistive sensing system, to sense and measure proximity, position, displacement or acceleration of an object, such as a finger or stylus. Another HID utilizes an optical finger navigation system or ONS, which uses changes in an image or pattern of light reflected from an object position on or over a surface of the HID to detect and measure proximity, position, displacement or acceleration of the object. Existing capacitive or resistive touch sensors suffer from a number of disadvantages including limited tracking resolution, and limited tracking speed. In addition, touchscreens utilizing capacitive sensing systems have difficulty tracking objects covered by most types of electrically insulating material, such as a gloved finger. However, ONS utilized in existing optical track-pad and optical track-ball applications are prone to manufacturing process variation, requiring a high level of optical calibration, have large performance variation across tracking speeds, and have a relatively small active-area due to limitations of light sources used. In addition, because ONS work well only within a narrow range around a nominal design height separating the object from the ONS and due to the lift-cutoff requirement in most applications that using ONS lift detection is necessary to detect when the ONS is separated from the object by more than a maximum lift-height to prevent spurious data from the HID. Previous ONS that rely on an optical lift-cut-off mechanism based on image defocus are not satisfactory for non-image based ONS. In addition, non-image-defocus based optical lift-cut-off mechanism employed in the non-image based ONS, is sensitive to manufacturing process variation, requiring rather tight manufacturing tolerances, and/or reducing tracking.

BRIEF DESCRIPTION OF THE DRAWINGS

These and various other features of a hybrid sensor module and methods of operation will be apparent upon reading of the following detailed description in conjunction with the accompanying drawings and the appended claims provided below, where:

FIG. 1 illustrates a block diagram of a device including a hybrid sensor module;

FIG. 2 illustrates a block diagram of a hybrid sensor module;

FIG. 6 illustrates a speckle pattern in light returned from an optically rough surface;

FIG. 7 illustrates a schematic block diagram of a speckle based linear or one-dimensional (1D) comb-array for use in a hybrid sensor module;

DETAILED DESCRIPTION

Figure 3A:
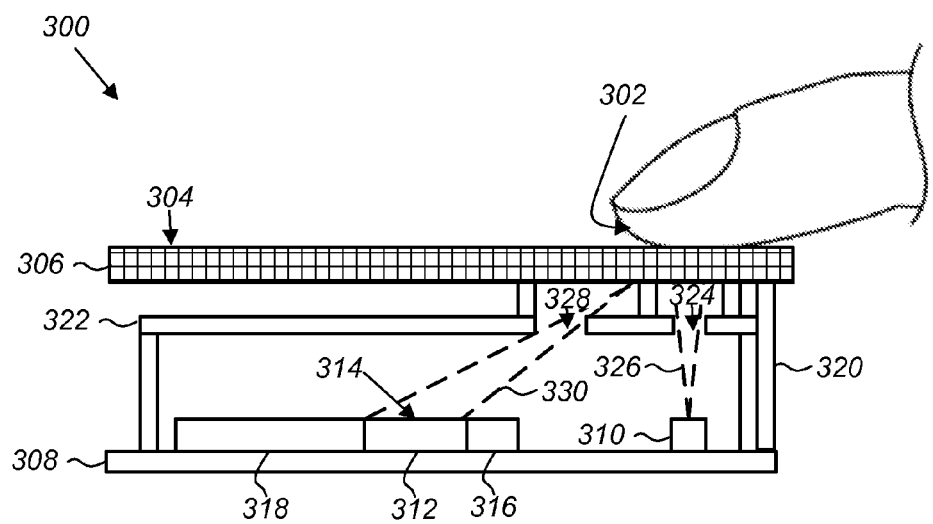
FIGS. 3A and 3B illustrate a block diagram of a hybrid sensor module.

Hybrid sensor modules and methods are provided for use in an input device to sense relative movement between the hybrid sensor module and a tracking surface, such as a surface of a stylus or finger. In one embodiment, the hybrid sensor module includes: (i) a touch sensor configured to sense motion of an object in proximity to a surface of the touch sensor; (ii) an optical navigation sensor (ONS) configured to illuminate the object through the surface of the touch sensor and to sense motion of the object based on light returned from the object; and (iii) a controller electrically coupled to the touch sensor and ONS to process the sensed motion of the object and to generate an output signal in response to the sensed motion, wherein the controller is configured to dynamically adjust a tracking resolution of the hybrid sensor module based on a characteristic of the sensed motion.

The drawings described are only schematic and are non-limiting. In the drawings, the size of some of the elements may be exaggerated and not drawn to scale for illustrative purposes. The dimensions and the relative dimensions may not correspond to actual reductions to practice of the invention. For purposes of clarity, many details of optical navigation sensors and touch sensors in general, and principles of operation of capacitive and resistive touch sensors in particular, which are widely known and not relevant to the present apparatus and method have been omitted from the following description.

An electronic system or device 100, such as a tablet computer, smartphone or human interface device (HID), utilizing a hybrid position sensor for detecting a presence of an object 102, such as a stylus or finger, is shown in FIG. 1. Referring to FIG. 1, in the embodiment shown the device 100 includes a display 104 and a touch sensor 106 extending over the display that can sense the presence, location and motion of an object 102 or a tracking-surface of the object in proximity to a surface 108a, 108b, of the touch sensor. The surface of the touch sensor 106 includes a first portion of the surface 108a extending over the display and a second portion of the surface 108b not extending over the display 104. The second portion 108b of the surface of the touch sensor 106 includes an optical hot-spot 110 overlying an ONS (not shown in this figure) adjacent to the display 104 and configured to illuminate the object through the second portion of the surface and to sense the presence, location and motion of the object based on light returned therefrom. Although described with respect to a touchscreen, or touch sensor overlying a display, it will be appreciated that the hybrid position sensor and method of the present disclosure can be advantageously used with other systems or devices that do not incorporate a visual display, such as a touchpad, scroll wheel or scroll bar, to improve tracking resolution thereof.

A block diagram of a hybrid sensor module 200 is illustrated in FIG. 2. Referring to FIG. 2, the hybrid sensor module 200 includes an ONS 202, a touch sensor 204, and a controller 206 electrically coupled to the touch sensor and ONS. The ONS 202 is configured to illuminate an object (not shown in this figure) through a surface of the hybrid sensor module 200 or touch sensor 204, and to sense the presence, location and/or motion of the object based on light returned from the object through the surface, and to provide data or signals to controller 206. Signals provided to the controller 206 can include data representing XY motion or position of the object relative to the ONS, data representing gestures, such as tapping or double tapping the surface, and data representing an optical signal. By optical signal it is meant both a signal representing a quantum of environmental or ambient light striking a detector of the ONS 202 when not obscured by an object, and a signal representing the strength of light returned from the object, and therefore the quality or reliability of other signals from the ONS. The ONS 202 generally can use any suitable technology for sensing the object or a surface of the object including, for example, image correlation, and dark field or speckle based sensors, described in greater detail below.

The touch sensor 204 is also configured to sense the presence, location and/or motion of an object or objects in proximity to the surface of the touch sensor, and to provide data or signals to controller 206. In one embodiment, the hybrid sensor module is a capacitive sensor, and can include a matrix or capacitive sensing array 208 of capacitive sensor elements 210, each formed from an intersection of one of a number of receive electrodes 212 and transmit electrodes 214. The sensor array 208 is coupled to capacitive sensor control circuitry, which can be embodied in the controller 206, as shown, or can include a separate, distinct component or integrated circuit (IC). Generally, the capacitive sensor control circuitry can include a relaxation oscillator or other means to convert a capacitance, a counter or timer to measure the oscillator output, and processing logic implemented in firmware, hardware or software to convert the count value (e.g., capacitance value) into a sensor element detection decision (also referred to as switch detection decision) representing a measured value or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms, any one or more of which can be used without departing from the scope of the present disclosure.

Alternatively, in another embodiment the hybrid sensor module includes a resistive sensing array, and the sensor elements 210 of the resistive sensor array 208 can include resistive elements formed from an intersection of a number of top flexible electrodes 212 one or more of a number of lower electrodes 214 separated by an air gap or microdots. As with the capacitive sensor embodiment described above, the resistive sensor array 208 is coupled to resistive sensor control circuitry embodied in the controller 206, as shown, or can in a separate, distinct component or IC. The sensor elements 210 of the resistive sensor array 208 respond to pressure on the surface of the touch sensor caused by a finger or other object in contact with the surface.

Signals provided to the controller 206 from a capacitive or resistive touch sensor 204 can include data representing XY motion or position of the object relative to the surface of the touch sensor 204, data representing gestures, such as tapping or double tapping the surface, and data representing lift-off detection of an object from the surface. By lift-off detection it is meant the touch sensor 204 detects when the object is no longer in contact with a portion of the surface overlying the ONS 202 or has been lifted to a lift height separating the object from the OFN exceeding a manufacturer or user specified maximum lift height. Lift-off detection data or signals can be used by the controller 206 to cut-off or to interrupt data from the ONS 202 representing XY motion or position of the object relative to the ONS, and/or data representing gestures. It is noted that capacitive or resistive sensors can generally provide touch detection, lift-detection, and accurate tracking resolution of XY motion at relatively low tracking speeds.

The controller 206 includes control circuitry to operate the ONS 202, and, as noted above, to operate the capacitive or resistive touch sensor 204, and digital signal processor (DSP) or DSP circuitry to process signals and data received from the ONS 202 and touch sensor 204 to generate one or more output signals including, for example, output signals relating to an XY motion or position of one or more objects proximal to the surface of the hybrid sensor module 200, gesture data, lift-detection and an optical signal. In addition, the controller 206 further includes circuitry and/or firmware to automatically and dynamically adjust a tracking resolution of the hybrid sensor module 200 module based on a characteristic of the signals and/or the sensed motion received from the ONS 202 and/or touch sensor 204. In certain embodiments, the controller 206 is configured to generate output signals in response to a weighted combination of the sensed motion from the ONS 202 and from the touch sensor 204. For example, the controller 206 can be configured to give greater weight to the sensed motion from the ONS 202 when the speed of the sensed motion is more than a specified speed, and to give greater weight to the sensed motion from the touch sensor 204 when the speed of the sensed motion is less than the specified speed. Exemplary values for the specified speed in tracking an object, such as a finger, can include speeds in the range of from about 1 cm/sec to about 50 cm/sec.

In other embodiments, controller 206 further includes circuitry and/or firmware to detect a lift height between the object and the surface, and to give less weight to the sensed motion from the ONS 202 when the lift height exceeds the specified maximum lift height, or to give less weight to the sensed motion from the touch sensor 204 when strength of a signal from the touch sensor 204 is less than a specified amount. One example of the later embodiment can be particularly useful when the touch sensor 204 is a capacitive sensor and the object it is attempting to sense is an insulating object, such as a gloved finger.

Figure 3B:
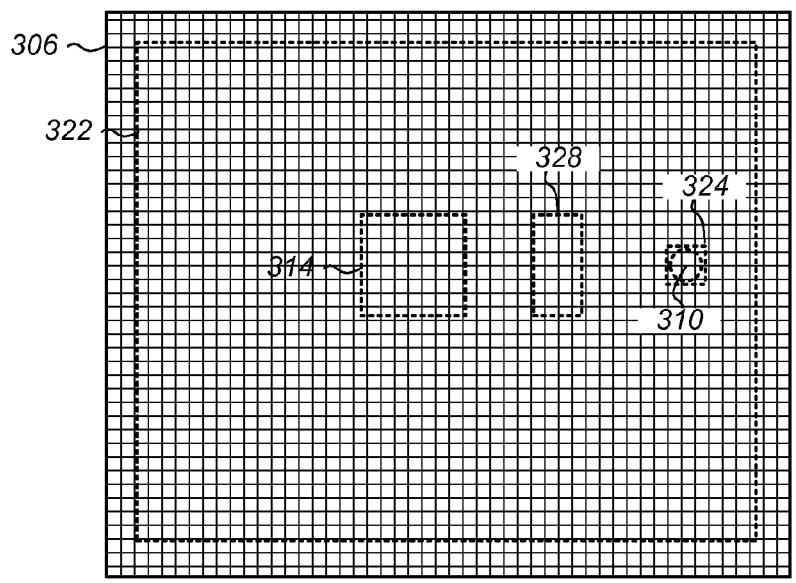

In one embodiment, shown in FIGS. 3A and 3B, the hybrid sensor module 300 is a finger navigation module for sensing relative movement of a tracking-surface 302 (such as the surface of a finger, a stylus, a palm, or other suitable object) over an optically transparent surface 304 of a touch sensor 306. The hybrid sensor module 300 may detect gestures, such as tapping or double tapping of surface 304, as well as elative movement between the tracking-surface and the hybrid sensor module.

Referring to FIG. 3A, the hybrid sensor module includes a substrate 308, such as a circuit board or printed circuit board (PCB) to which an illuminator or light source 310, such as a light emitting diode (LED), a laser or vertical-cavity surface-emitting laser (VCSEL), and an ONS sensor IC 312 are mounted. Components of the sensor IC 312 include a photo-detector or photo-detector array (PDA 314), such as an array of photodiodes, on top of the IC, front-end electronics 316, such as analog amplifiers, differential amplifiers and comparators, and signal processing circuitry or a signal processor for translating changes in a light pattern propagated onto the PDA from the tracking-surface 302 into motion, position or gesture data. By propagated it is meant the transmission or movement of light from the tracking-surface 302 onto the PDA 314 as the result of either scattering or reflection of light from the tracking surface.

The substrate 308 further includes a controller 318 electrically coupled to the sensor IC 312 and through a connector 320, such as a ribbon connector, to the touch sensor 306. The controller 318 can be integrally formed on a common IC shared with the sensor IC 312 or can include a separate, distinct component or IC mounted on or electrically coupled to the substrate 308.

The hybrid position sensor 300 further includes a light baffle or blocking element 322 having a number of openings formed therein to enable light to be transmitted from the light source 310 to the tracking-surface 302 and from the tracking-surface to the PDA 314 while shielding the PDA from light shining directly from the light source and/or ambient or environmental light passing through the surface 304 but not returned from the tracking surface. A first opening or aperture 324 in a light path 326 between the light source 310 and the tracking-surface 302 permits illumination of the tracking surface. A second opening or aperture 328 in a light path 330 between the tracking-surface 302 and the PDA 314 controls the light scattered onto the PDA and blocking environmental light.

FIG. 3B illustrates a top or plan view of the hybrid sensor module 300 of FIG. 3A. The light blocking element 322 including the first and second apertures 324, 328, PDA 314, and light source 310 are shown in phantom below the surface 304 of the touch sensor 306. Referring to FIG. 3B it is noted that the surface 304 of the touch sensor 306 covers or overlies substantially the entire hybrid sensor module 300. Thus, it will be understood that the touch sensor 306 will be able to sense the presence, motion or gestures of an object or tracking-surface 302 anywhere on or over the surface 304 of the touch sensor. It will further be understood that the ONS will be limited to those portions of the surface 304 capable of being illuminated by the light source 310 and from which light can be returned to the PDA 314.

Figure 4A:
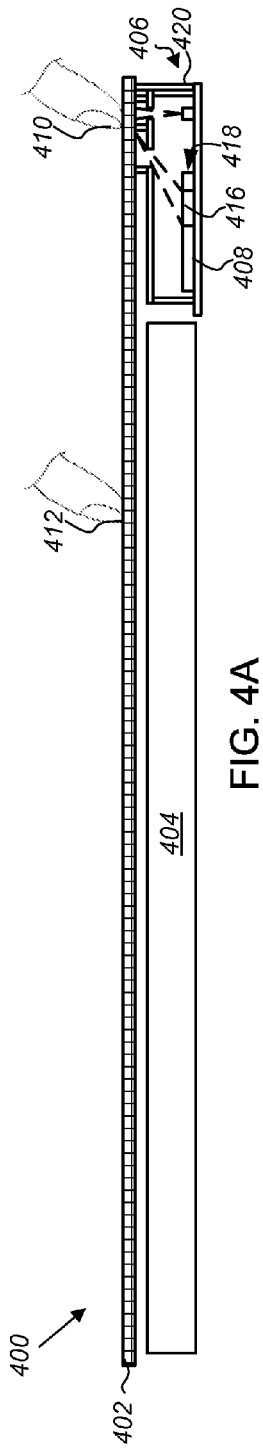
FIGS. 4A and 4B illustrate a block diagram of a hybrid sensor module included in a multi-touch touchscreen.
Figure 4B:
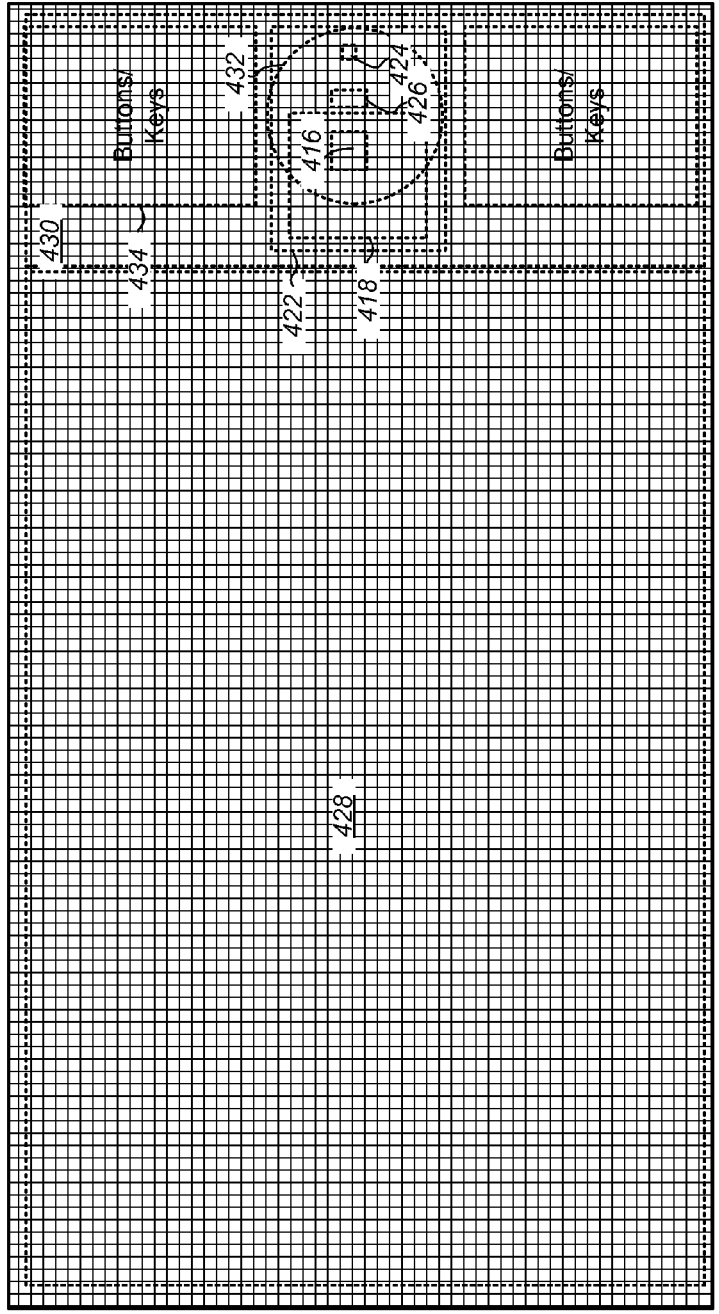

In another embodiment, shown in FIGS. 4A and 4B, the hybrid position sensor 400 includes a touch sensor 402 extending over a display 404 adjacent to the ONS 406, and the controller/DSP 408 can include circuitry and/or firmware to enable the controller/DSP to generate one or more output signals including, for example, output signals relating to an XY motion or position of a multiple objects 410, 412, proximal to the surface of the hybrid sensor module, multi-touch gesture data, lift-detection and an optical signal. Referring to FIGS. 4A and 4B, the hybrid position sensor 400 includes an ONS with a light source 414, a PDA 416 in a sensor IC 418 and coupled to the sensor IC and the touch sensor 402 through a connector 420. As described above with respect to FIGS. 3A and 3B the hybrid position sensor 400 further includes a light baffle or blocking element 422 having a number of openings 424, 426, formed therein to enable light to be transmitted from the light source 414 to a first object overlying the ONS and from the first object to the PDA 416 while shielding the PDA from light shining directly from the light source and/or ambient or environmental light passing through the surface of the touch sensor 402 but not returned from the first object.

The surface of the touch sensor 402 includes a first portion 428 extending over the display 404 and a second portion 430 not extending over the display. The second portion 430 of the surface of the touch sensor 402 includes an optical hot-spot 432 overlying the ONS and adjacent to the display 404. In addition, the second portion 430 of the surface of the touch sensor 402 can further include a number of areas or regions 434 for implementing a number of touch sensitive buttons or keys using the touch sensor.

Figure 5:
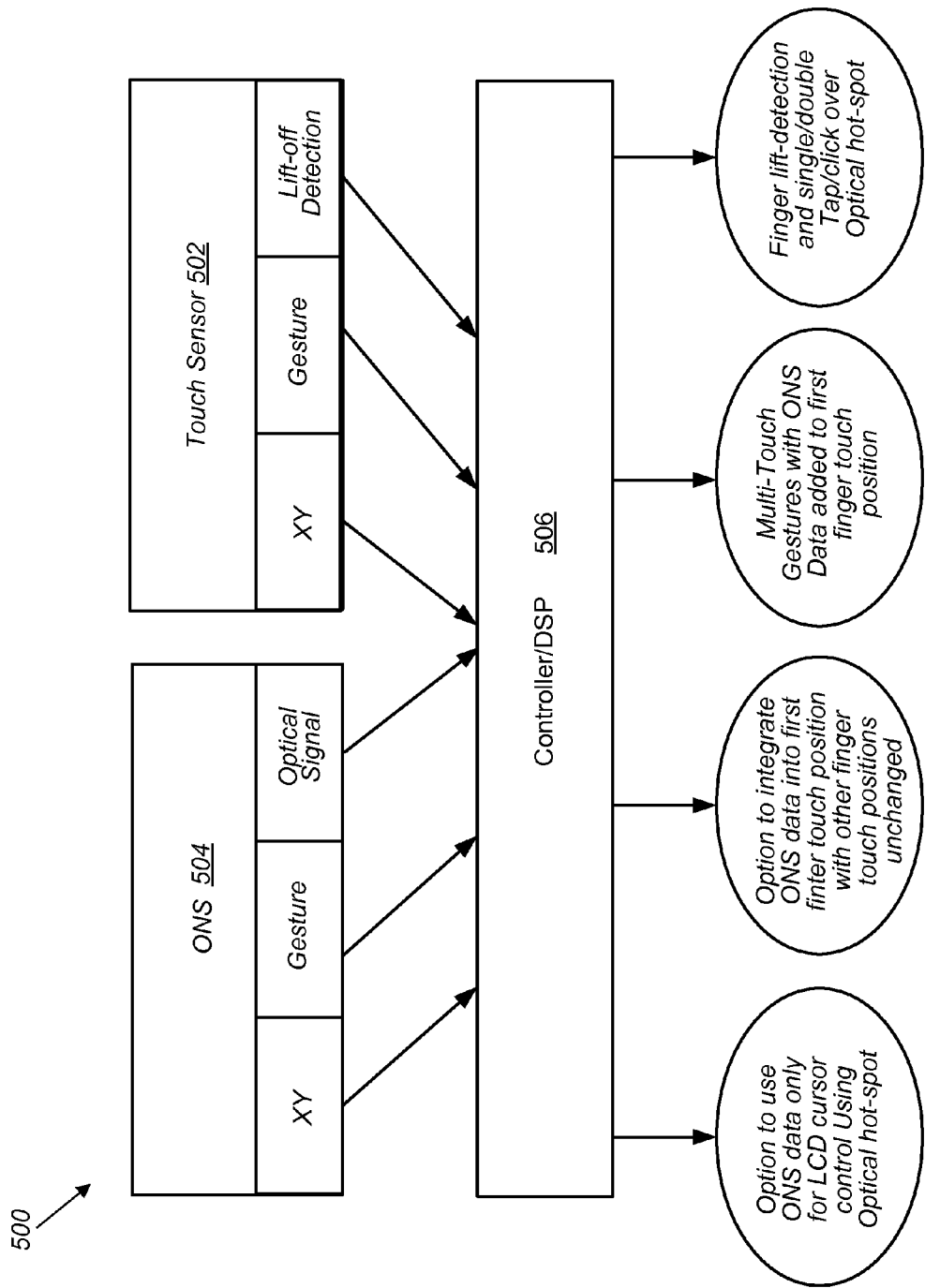
FIG. 5 is a block diagram illustrating functions of an embodiment of a hybrid sensor module included in a multi-touch touchscreen.

In one embodiment, shown in FIG. 5, in which the hybrid sensor module 500 includes a touch sensor 502 extending over a display (not shown in this figure) adjacent to the ONS 504, the controller/DSP 506 can include circuitry and/or firmware to enable the controller/DSP to generate one or more output signals including, for example, output signals relating to an XY motion or position of multiple objects proximal to the surface of the hybrid sensor module 500, multi-touch gesture data, lift-detection and an optical signal. In addition, the controller/DSP 506 can further include circuitry and/or firmware to generate an output signal using ONS 504 data only to control movement of a cursor (not shown in this figure) in the display. Alternatively, the controller/DSP 506 can include circuitry and/or firmware to generate an output signal to control movement of the cursor integrating ONS 504 data and data from the touch sensor 502 associated with an object proximal to a portion of the surface of the touch sensor overlying the ONS.

In certain embodiments, the ONS described above is a dark field or speckle-based ONS detecting and utilizing changes in a light pattern in light scattered from the object or tracking-surface to sense motion, position or gestures, rather than correlating successive images of the object or tracking surface. Operating principles of a speckle-based ONS will now be described with reference to FIG. 6. For purposes of clarity, many of the details of speckle-based ONS, which are widely known and not relevant to the present invention, have been omitted from the following description.

Referring to FIG. 6, any general surface with morphological irregularities of dimensions greater than the wavelength of the incident light (i.e. roughly >1 µm) will tend to propagate or scatter light 602 into a complete hemisphere in approximately a Lambertian fashion. If a coherent light source, such as a laser is used, the spatially coherent light returned from the surface will create a complex interference pattern upon detection by a square-law detector with finite aperture. This complex interference pattern of light and dark areas is referred to as speckle or a speckle pattern 604. As shown in FIG. 6, the contribution for the measured speckle pattern 604 comes from rays 606 between the surface normal 608 and the extreme rays 612. Speckle is the random interference pattern generated by scattering of coherent light off a rough surface and detected by an intensity photosensitive element, such as a photodiode, with a finite angular field-of-view or numerical aperture (NA). The detailed nature of the speckle pattern depends on the surface topography, and the wavelength of light propagated or scattered therefrom. A translational speckle pattern resulted from a moving rough surface can be employed to identify any relative motion between the ONS and the surface as it is displaced transversely to the ONS.

A speckle sensitive photo-detector array can include one or more linear or one-dimensional (1D) or a two-dimensional (2D) comb-array having multiple detectors or photosensitive elements arranged in a two-dimensional configuration.

A linear or 1D comb-array is an array having multiple photosensitive elements that are connected in a periodic manner, so the array acts as a fixed template that integrates one spatial frequency component of the signal. An embodiment of one such 1D comb-array is shown in FIG. 7. The connection of multiple photosensitive elements in a periodic manner enables the comb-array to serve effectively as a correlator at one spatial frequency K (defined by a pitch of the photosensitive elements in the array and the collection optics). FIG. 7 shows a general configuration (along one axis) of a 1D comb-array 702 of photosensitive elements, such as photodiodes 704, wherein the combination of interlaced groups of photosensitive elements serves as a periodic filter on spatial frequencies of light-dark signals 705 produced by the speckle (or non-speckle) images. In the embodiment shown, the 1D comb-array 702 includes of a number of photodiode sets or periods, each having four of photodiodes 704, labeled here as A, B, C, and D. Currents or signals from corresponding or similarly labeled photodiodes 704 in each period are electrically connected (wired sum) to form four line signals 706 coming out from the array 702. Background suppression and signal accentuation is accomplished by using first differential analog circuitry 708 to generate an in-phase differential current signal, labeled here as $C_{out}$, and second differential analog circuitry 710 to generate a quadrature differential current signal, labeled here as $S_{out}$. Comparing the phase of the in-phase and quadrature signals permits determination of the magnitude and direction of motion of the 1D comb-array 702 relative to a tracking surface.

Referring to FIG. 7, the in-phase $C_{out}$ and the quadrature $S_{out}$ signals are obtained by taking the underlying speckle pattern and processing them according to the cosine and sine templates, 712 and 714 respectively. The ONS may be designed so that an optical "light-dark" signal pattern, i.e., speckle, has a size substantially equal to the period of the comb-array—four (4) photodiodes 704 or pixels in the embodiment of FIG. 7. The in-phase signal current is obtained from $C_{out}$=A−C, and the quadrature signal current from $S_{out}$=B−D as shown in FIG. 7.

Figure 8:
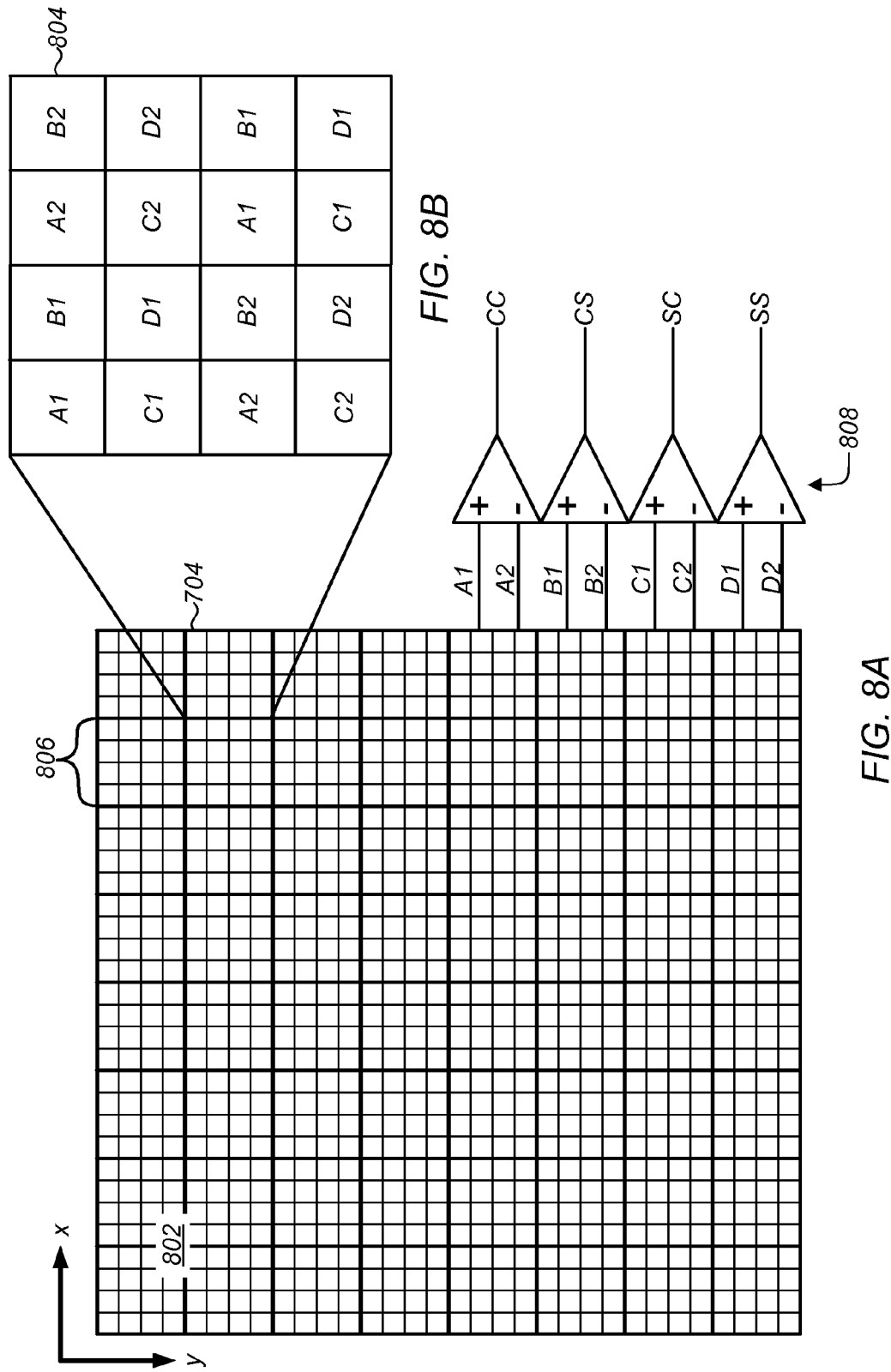
FIGS. 8A and 8B illustrate schematic block diagrams of a two-dimensional (2D) comb-array for use in a hybrid sensor module.

In one embodiment the photo-detector array includes photodiodes or photosensitive elements are arranged in two dimensions (2D), as shown in FIGS. 8A and 8B. The performance of the 2D comb-array is expected to be superior to the 1D×1D case since each point in the image, in the average, traverses a much longer path inside the 2D detector active area in all directions and therefore contributes more to the displacement estimation. FIGS. 8A and 8B are schematic block diagrams of a 2D comb-array having photosensitive elements grouped in a 4×4 elements-per-cell configuration. Referring to FIGS. 8A and 8B, the 2D comb-array 802 may have multiple photosensitive elements 804 arranged or grouped into cells 806, each cell having photosensitive elements grouped in a 4×4 elements-per-cell (or 4×4 elements/period) configuration. Photosensitive elements 804 within a cell 806 with the same letter and same number, as shown in the detail of FIG. 5B, as well as corresponding elements of all cells in the 2D comb-array 802 with the same number, are electrically connected or wired-sum to yield eight signals A1 through D2. The eight wired-sum signals are further combined with differential amplifiers 808 to provide four signals containing the in-phase and quadrature information in the x and y directions.

Figure 9:
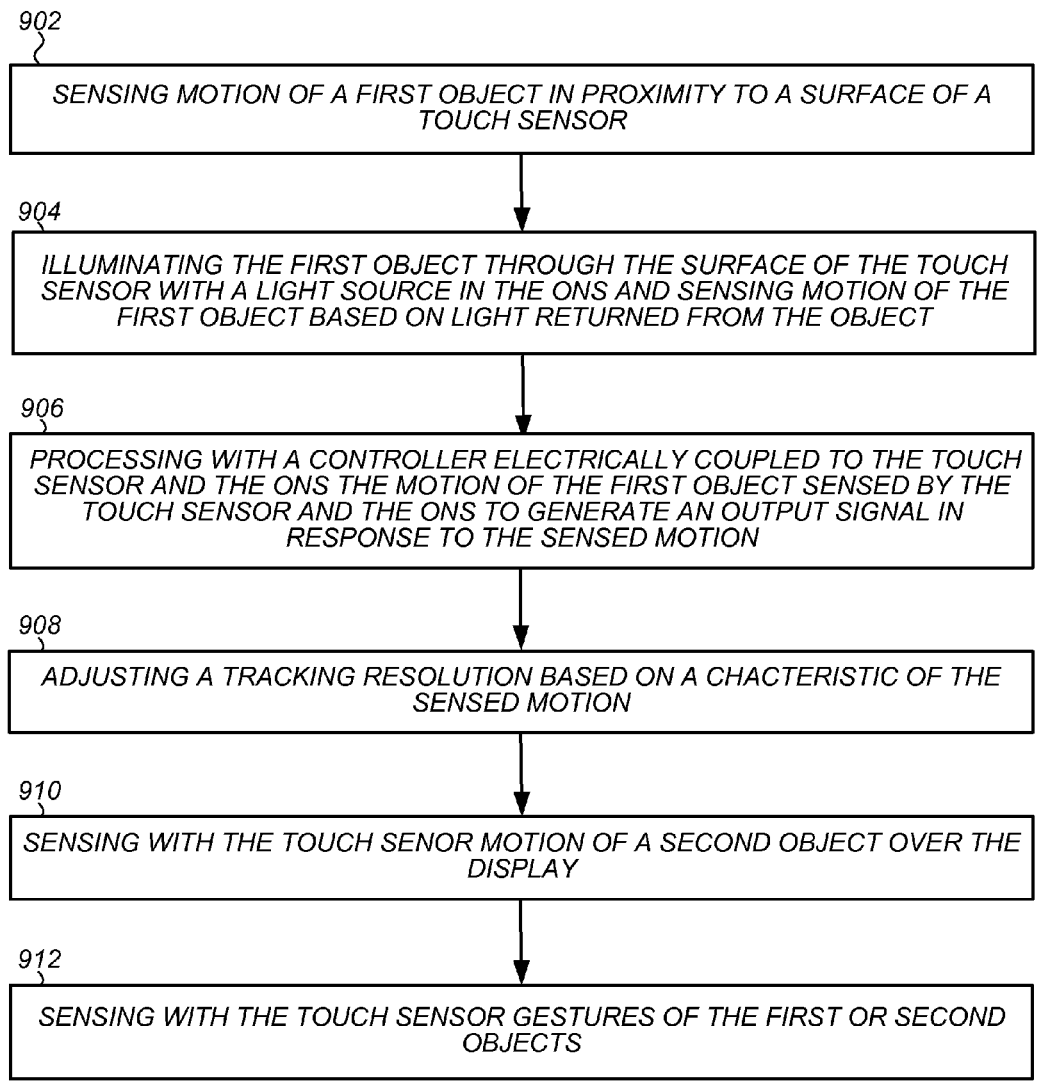
FIG. 9 is a flow chart of an embodiment of a method for operating a hybrid sensor module.

Embodiments of methods for operating a hybrid sensor module will now be described with reference to the flowchart of FIG. 9.

In a first block, motion of a first object or finger in proximity to a surface of a touch sensor is sensed by the touch sensor (902). As noted above, in embodiments in which the touch sensor is a resistive touch sensor or includes a resistive array, the object or finger must be in contact with the surface. Alternatively, in embodiments in which the touch sensor is a capacitive touch sensor or includes a capacitive array, the object may be proximal to surface without being in contact. The first object is also illuminated through the surface of the touch sensor with a light source in the ONS, and motion of the first object sensed by the ONS based on light returned from the object (904). Next, a controller electrically coupled to the touch sensor and the ONS processes the motion of the first object sensed by the touch sensor and the ONS to generate an output signal in response to the sensed motion (906), and automatically or dynamically adjusts a tracking resolution of the hybrid position module based on a characteristic of the sensed motion (908).

As noted above, adjusting the tracking resolution can include weighting and combining the sensed motion from the ONS and from the touch sensor. In one embodiment, the controller gives greater weight to the sensed motion from the ONS when the speed or acceleration of the sensed motion is greater than a specified amount, and gives greater weight to the sensed motion from the touch sensor when the speed or acceleration is less than the specified speed. Alternatively or additionally, the method can further include detecting with the touch sensor when a lift height between the first object and the surface exceeds a maximum lift height adjusting the tracking resolution can include giving less weight to the sensed motion from the ONS and correspondingly greater weight to the sensed motion from the touch sensor. Similarly, adjusting the tracking resolution can alternatively or additionally include giving greater weight to the sensed motion from the ONS when strength of a signal representing the sensed motion from the touch sensor is less than a specified amount.

Optionally, in certain embodiments, such as that described above with respect to FIGS. 4A and 4B, in which the touch sensor extends over a display in a device incorporating the hybrid sensor module, the method can include sensing with the touch sensor motion of a second object on a portion of the surface of the touch sensor extending over the display (910). The method can further include sensing with the touch sensor gestures of either or both of the first or second objects (912).

Thus, embodiments of a hybrid sensor module and methods for operating the same have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the forgoing description, for purposes of explanation, numerous specific details have been set forth in order to provide a thorough understanding of the hot de-latch system and method of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the system or method. The appearances of the phrase "one embodiment" in various places in the specification do not necessarily all refer to the same embodiment. The term "to couple" as used herein may include both to directly electrically connect two or more components or elements and to indirectly connect through one or more intervening components.

What is claimed is:

1. A hybrid sensor module comprising:
a touch sensor configured to sense motion of a first object in proximity to a surface of the touch sensor;
an optical navigation sensor (ONS) configured to illuminate the first object through the surface of the touch sensor and to sense motion of the first object based on light returned from the first object; and
a controller electrically coupled to the touch sensor and ONS to process sensed motion of the first object and to generate an output signal in response to the sensed motion, wherein the controller is configured to dynamically adjust a tracking resolution of the hybrid sensor module based on a characteristic of the sensed motion, and to generate the output signal in response to a weighted combination of the sensed motion from the ONS and from the touch sensor, and to give greater weight to the sensed motion from the ONS when a speed of the sensed motion from the ONS is more than a specified speed, and to give greater weight to the sensed motion from the touch sensor when the speed of the sensed motion from the touch sensor is less than the specified speed.

2. A hybrid sensor module comprising:
a touch sensor configured to sense motion of a first object in proximity to a surface of the touch sensor;
an optical navigation sensor (ONS) configured to illuminate the first object through the surface of the touch sensor and to sense motion of the first object based on light returned from the first object; and
a controller electrically coupled to the touch sensor and ONS to process sensed motion of the first object and to generate an output signal in response to the sensed motion, the controller configured to dynamically adjust a tracking resolution of the hybrid sensor module based on a characteristic of the sensed motion, and to generate the output signal in response to a weighted combination of the sensed motion from the ONS and from the touch sensor,
wherein the touch sensor is configured to detect a lift height between the first object and the surface, and wherein the controller is configured to give less weight to the sensed motion from the ONS when the lift height exceeds a maximum lift height.

3. The hybrid sensor module of claim 2, wherein the touch sensor extends over a display of a device comprising the hybrid sensor module, and wherein the touch sensor is configured to sense motion of the first object illuminated by the ONS and to sense motion of a second object over the display.

4. The hybrid sensor module of claim 3, wherein the touch sensor is further configured to sense gestures of at least one of the first object or second object.

5. The hybrid sensor module of claim 2, wherein the controller comprises an integrated circuit (IC) and the ONS comprises a photo-detector array (PDA) on a substrate with the IC.

6. The hybrid sensor module of claim 1, wherein the controller is configured to give greater weight to the sensed motion from the ONS when strength of a signal from the touch sensor is less than a specified amount.

7. The hybrid sensor module of claim 1, wherein the touch sensor extends over a display of a device comprising the hybrid sensor module, and wherein the touch sensor is configured to sense motion of the first object illuminated by the ONS and to sense motion of a second object over the display.

8. The hybrid sensor module of claim 7, wherein the touch sensor is further configured to sense gestures of at least one of the first object or second object.

9. The hybrid sensor module of claim 7, wherein controller is configured to use the sensed motion from the ONS to provide data to control movement of a cursor in the display.

10. The hybrid sensor module of claim 1, wherein the controller comprises an integrated circuit (IC) and the ONS comprises a photo-detector array (PDA) on a substrate with the IC.

11. The hybrid sensor module of claim 1, wherein the touch sensor comprises a capacitive sensing array.

12. The hybrid sensor module of claim 1, wherein the touch sensor comprises a resistive sensing array.

13. A method of operating a hybrid sensor module comprising:
sensing motion of a first object in proximity to a surface of a touch sensor;
illuminating the first object through the surface of the touch sensor with a light source in an optical navigation sensor (ONS) and sensing motion of the first object based on light returned from the first object;
processing with a controller electrically coupled to the touch sensor and the ONS motion of the first object sensed by the touch sensor and by the ONS to generate an output signal in response to the sensed motion; and
adjusting a tracking resolution of the hybrid sensor module based on a characteristic of the sensed motion, wherein adjusting the tracking resolution comprises weighting and combining with the controller the sensed motion from the ONS and from the touch sensor,
wherein weighting the sensed motion from the ONS and from the touch sensor comprises giving greater weight to the sensed motion from the ONS when a speed of the sensed motion from the ONS is more than a specified speed, and giving greater weight to the sensed motion from the touch sensor when the speed of the sensed motion from the touch sensor is less than the specified speed.

14. A method of operating a hybrid sensor module comprising:
sensing motion of a first object in proximity to a surface of a touch sensor;
illuminating the first object through the surface of the touch sensor with a light source in an optical navigation sensor (ONS) and sensing motion of the first object based on light returned from the first object;
processing with a controller electrically coupled to the touch sensor and the ONS motion of the first object sensed by the touch sensor and by the ONS to generate an output signal in response to the sensed motion;
adjusting a tracking resolution of the hybrid sensor module based on a characteristic of the sensed motion; and
detecting with the touch sensor a lift height between the first object and the surface of the hybrid sensor module, and when the lift height exceeds a maximum lift height giving less weight to the sensed motion from the ONS, wherein adjusting the tracking resolution comprises weighting and combining with the controller the sensed motion from the ONS and from the touch sensor.

15. The method of claim 14 wherein the touch sensor extends over a display of a device comprising the hybrid sensor module, and further comprising sensing with the touch sensor motion of a second object over the display.

16. The method of claim 15 further comprising sensing gestures of at least one of the first object or second object with the touch sensor.

17. The method of claim 13 wherein the touch sensor extends over a display of a device comprising the hybrid sensor module, and further comprising sensing with the touch sensor motion of a second object over the display.

18. The method of claim 17 further comprising sensing gestures of at least one of the first object or second object with the touch sensor.

\* \* \* \* \*